Feb. 9, 1960

F. KULICK ET AL 2,924,333

AUTOMATIC TEST SET

Filed Aug. 30, 1955

INVENTORS
F. KULICK
J. W. McGRATH
A. H. SPENCE

BY
W.C. Parnell
ATTORNEY

Feb. 9, 1960
F. KULICK ET AL
2,924,333
AUTOMATIC TEST SET
Filed Aug. 30, 1955
7 Sheets-Sheet 2
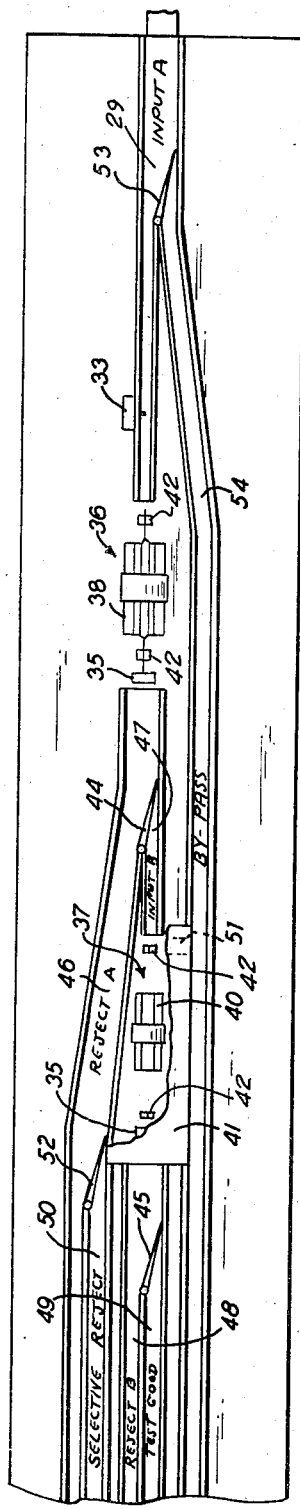
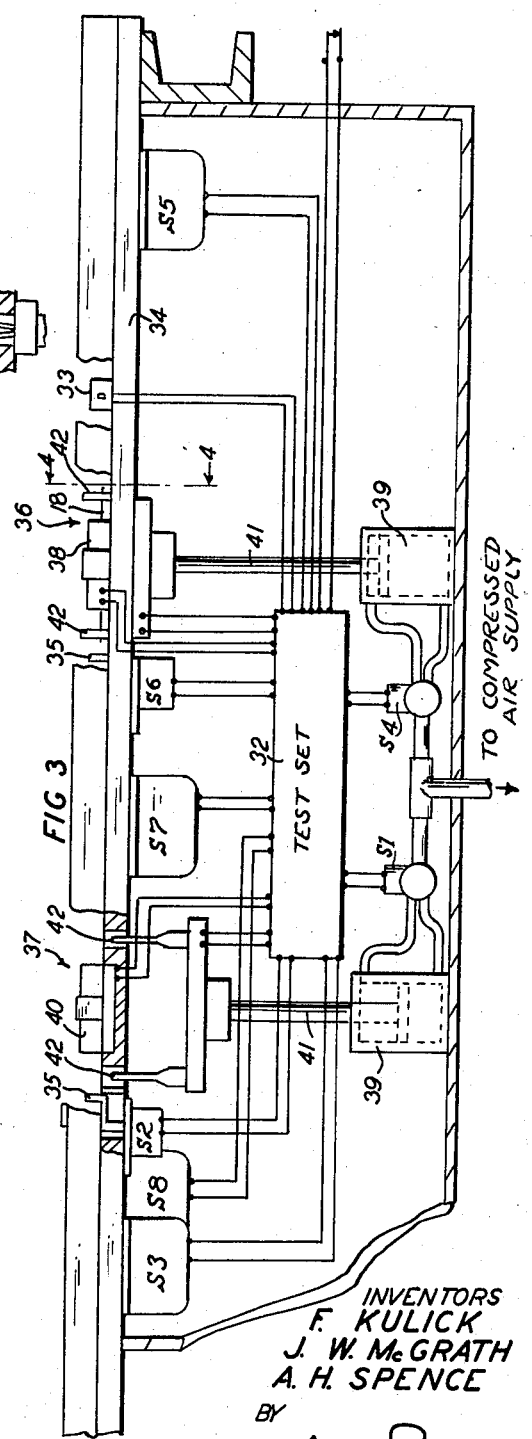
INVENTORS
F. KULICK
J. W. McGRATH
A. H. SPENCE
BY
*W.C. Parnell*
ATTORNEY

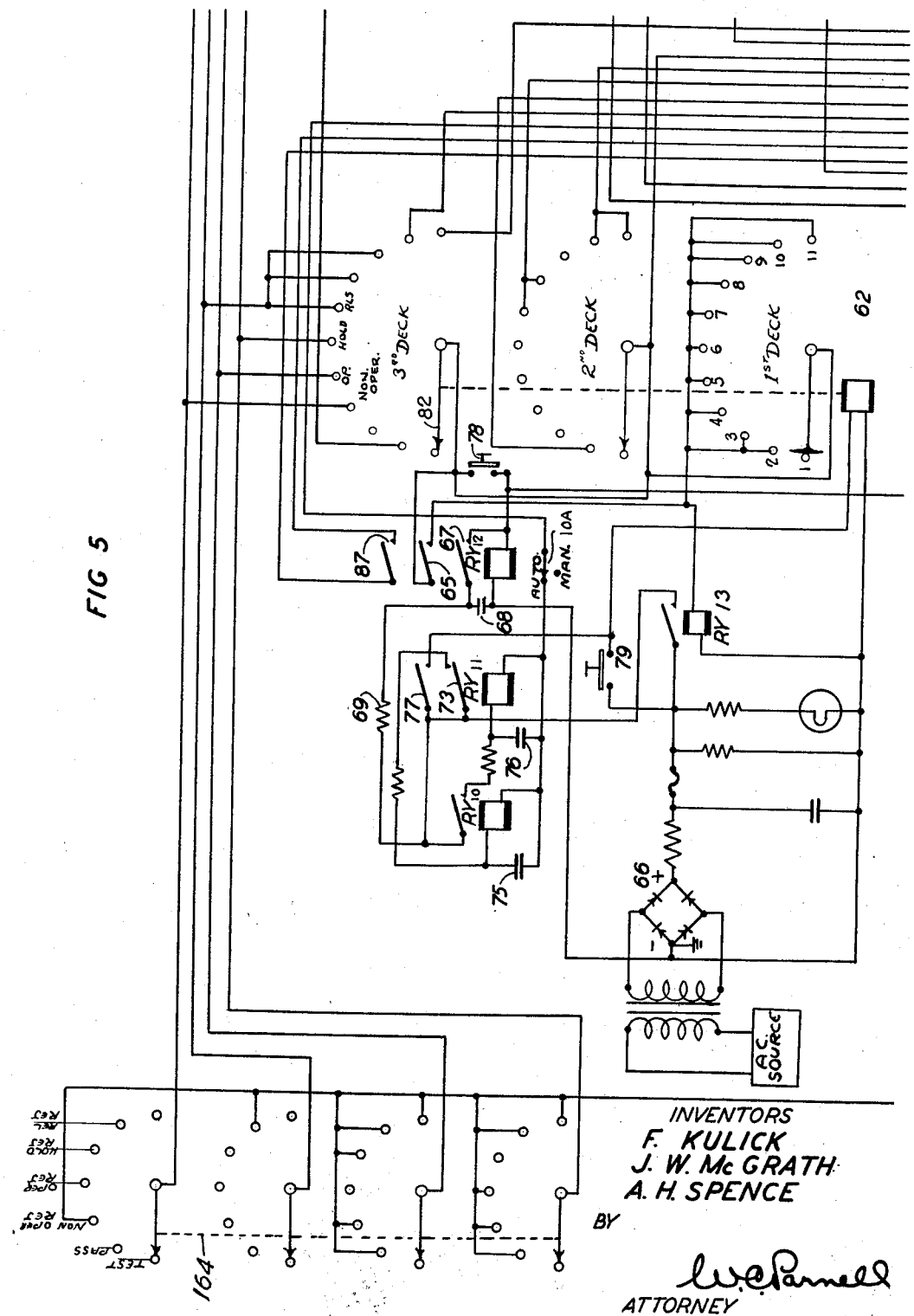

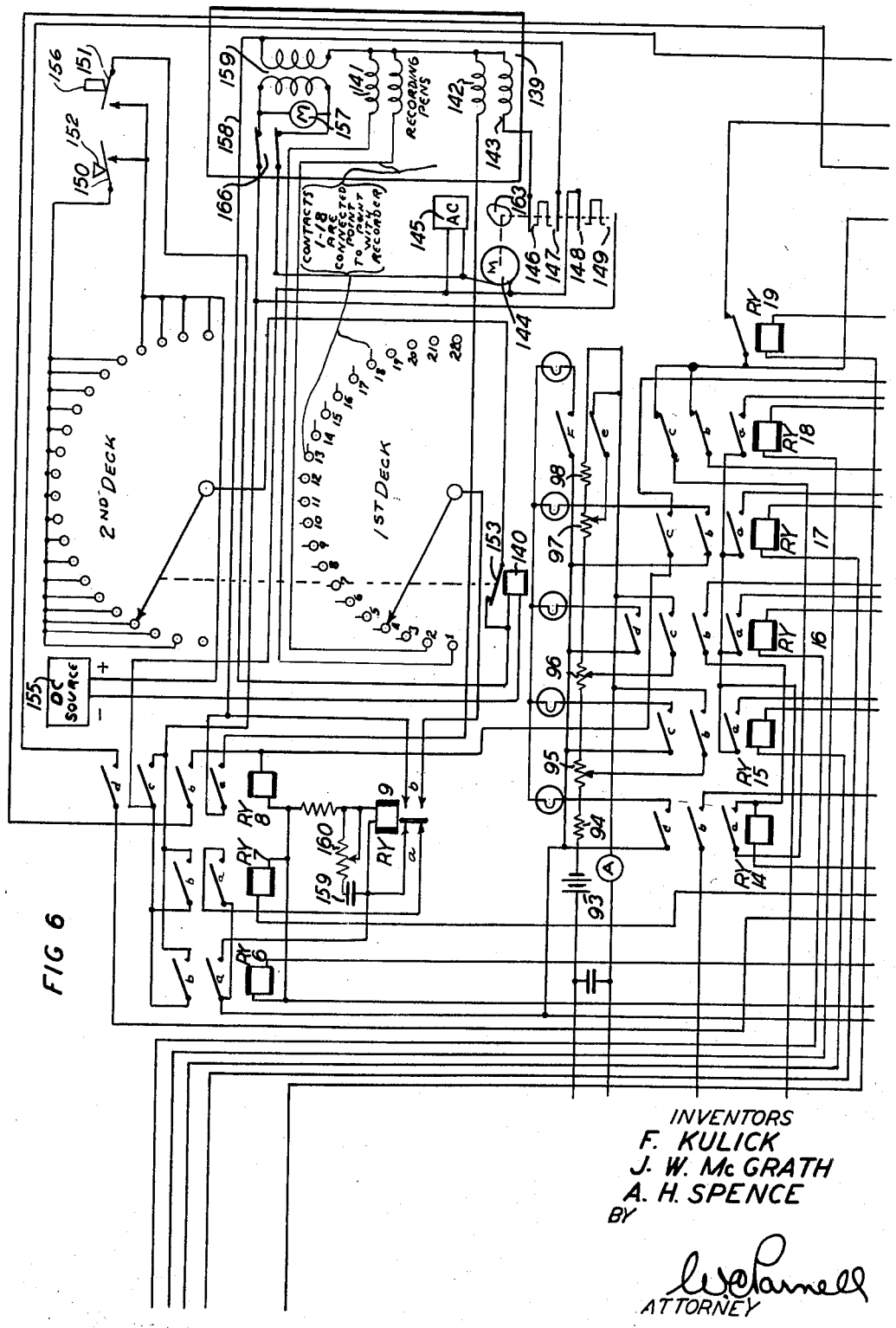

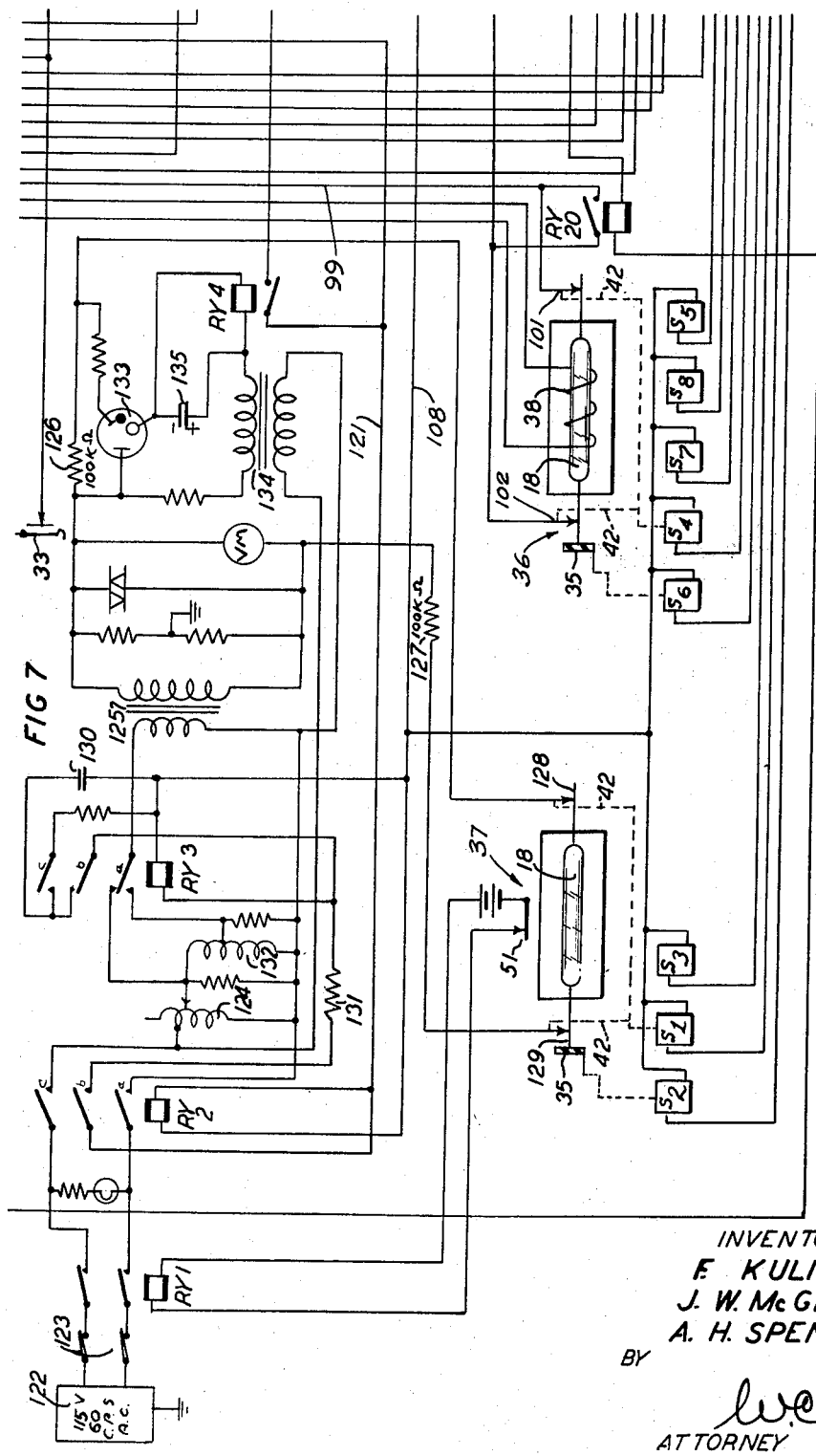

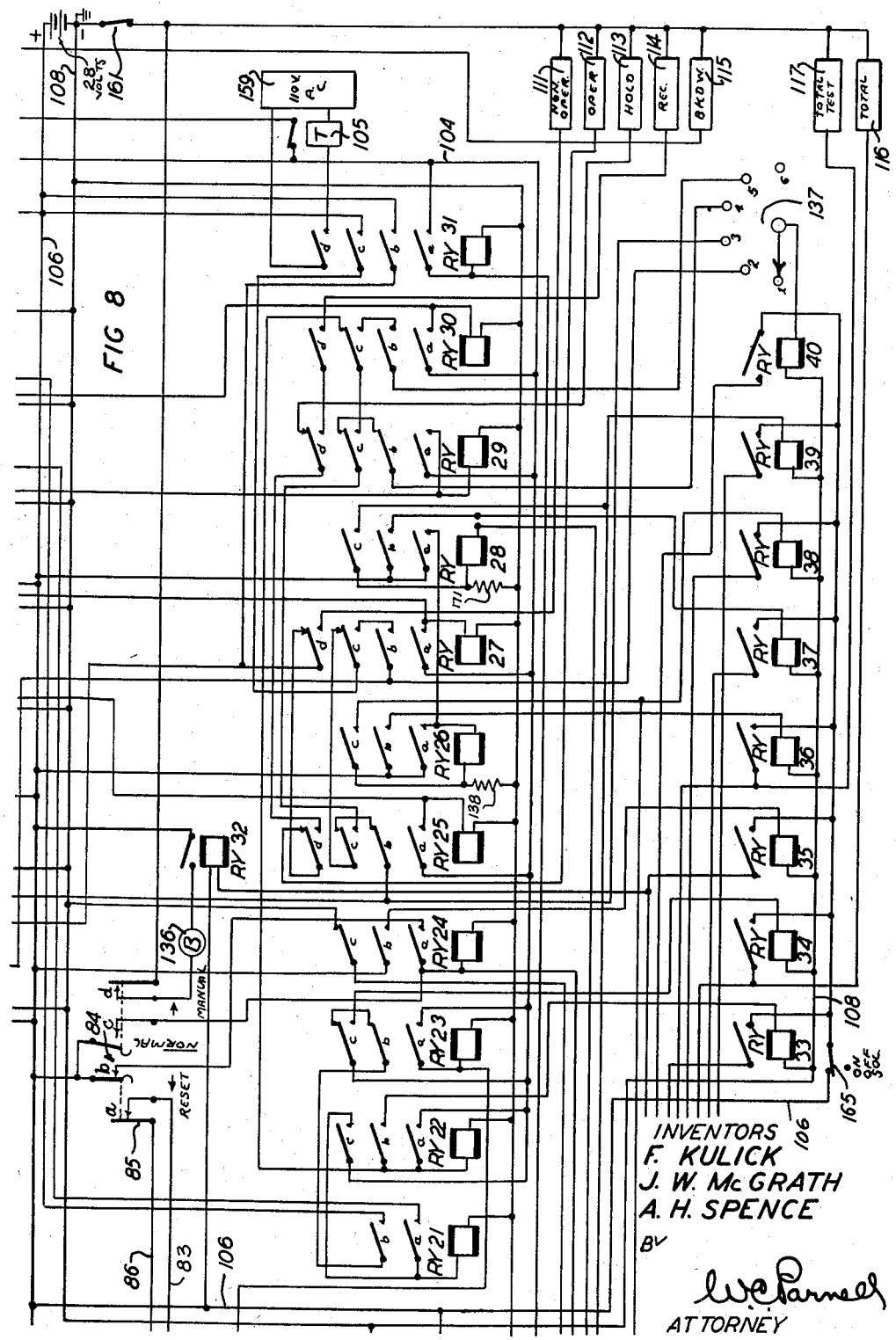

Feb. 9, 1960

F. KULICK ET AL 2,924,333

AUTOMATIC TEST SET

Filed Aug. 30, 1955

INVENTORS
F. KULICK
J. W. McGRATH
A. H. SPENCE
BY
ATTORNEY 2,924,333
                  AUTOMATIC TEST SET

Frederick Kulick, Coopersburg, John W. McGrath, Allentown, and Alburton H. Spence, Coopersburg, Pa., assignors to Western Electric Company, Incorporated, New York, N.Y., a corporation of New York Application August 30, 1955, Serial No. 531,518

8 Claims. (Cl. 209—75)

This invention relates to testing apparatus and particularly to an automatic test set for electrical articles such as dry reed switches, relays or vacuum tubes which may, for example, be tested in a fixture of the type disclosed in the co-pending application No. 531,547 of Messrs. A. L. House and J. J. Monahan, filed August 30, 1955, now U.S. Patent 2,885,076 granted May 5, 1959.

Mass produced devices of the aforementioned type must be subjected to a plurality of tests and then sorted in accordance with the results of the tests for repair or other final disposition. The Western Electric Company type 224 dry seed switches, which are manufactured on the multiple head machine disclosed in co-pending application No. 505,172 of Messrs. R. F. Brewer and J. A. Hosford filed May 3, 1955, are subjected to a number of "operational" tests and a high potential "breakdown" test in order to insure their proper functioning in communication and switching apparatus in which they are ultimately used.

It is, therefore, the main object of this invention to provide automatic apparatus for testing such devices.

In accordance with the general features of the invention, the articles to be tested are automatically subjected to a succession of tests and mechanisms are controlled by the outcome of the tests to selectively sort the tested articles.

A preferred embodiment of the invention, particularly adapted for testing dry reed switches at a rate of about 600 per hour as they are successively delivered from the multiple head assembly machine to the aforementioned test fixture, automatically and sequentially controls the positioning of the switches in two test stations in the fixture, connects them into test circuits, subjects a switch in a first test station to the "operational" tests and a switch in the second station to the high potential "breakdown" test. Test fixture gates in a network of downwardly inclined guide tracks are actuated by the test set in accordance with the results of the tests so that the switches, automatically released from the test stations at the conclusion of the tests, may be guided to appropriate sorting receptacles and switches passing the "operational" tests may be guided from the first test station to the second.

According to an important feature of the invention, records are automatically made of the respective heads of the assembly machine on which defective switches were made which makes it possible to detect assembly machine troubles resulting in an abnormal number of rejects from any one of the heads in the assembly machine thereby simplifying maintenance of the assembly machine.

These and other features of the invention will be more fully understood from the following detailed description taken in conjunction with the accompanying drawing, in which:

Fig. 2 is an enlarged plan view of the test fixture portion of Fig. 1;

Fig. 3 is an enlarged side elevational view of the test fixture of Fig. 2 showing some of the parts diagrammatically;

Fig. 4 is an enlarged view along the plane of line 4—4 of Fig. 3;

Figs. 5 through 8 show a schematic drawing of the automatic test set;

Fig. 9 shows the arrangement of Figs. 5 through 8;

Fig. 10 shows the current in the test coil for the different "operational" tests, and Fig. 11 is a chart showing the condition of the relays and solenoids for the various steps of the controlling stepping switch.

Figure 1:
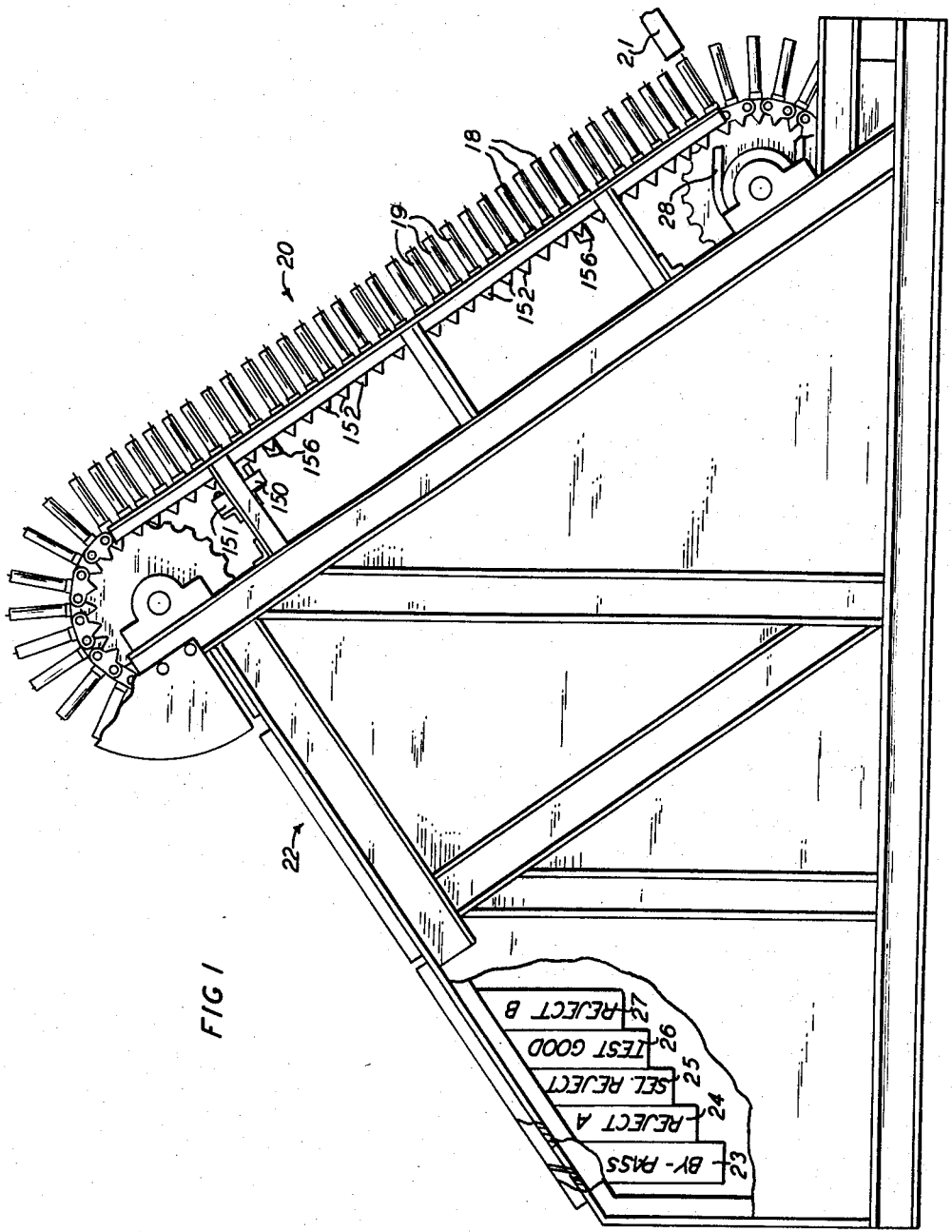
Fig. 1 is a side elevational view of a conveyor for receiving articles from an assembly machine and a test fixture and sorting means for the articles.

Referring now to the drawing, attention is first directed to Figs. 1 through 4 to describe generally the overall handling apparatus for the dry reed switches 18 as they are delivered from a tube 21 from the assembly machine (not shown) to receptacles 19 of a conveyor 20 and subsequently released from the conveyor to a test fixture 22 where they are subjected to the tests and thereupon channeled through sorting tracks to receptacles 23 through 27. As disclosed in the aforementioned application of Messrs. House and Monahan, the conveyor 20 is driven by a belt 28 so that successive receptacles 19 will be positioned to receive the switches 18 as they are successively delivered from the tube 21. In this way, switches to be tested are released to the test fixture 22 at the same rate as they are delivered from the assembly machine.

In general, the test fixture includes an inclined main base member 34 for supporting a first and second test station 36 and 37 respectively, a network of tracks 29, 46, 47, 48, 49, 50 and 54 for receiving switches delivered to the top of the fixture and for guiding them through the test stations and a number of receptacles 23 through 27 at the lower end of the member 34 for receiving the tested articles. The first test station 36, in which the dry reed switches are subjected to the "operational" tests, includes an actuating coil 38 for the switches, switch terminal contactors 42 and a blocking or stop member 35. The second test station 37 where the switches are subjected to a high potential "breakdown" test for testing the gas content of the switches includes a sleeve 40 (instead of the coil 38) for receiving the switches and switch terminal contactors 42 and a stop member 35 similar to those of the first test station 36. The contactors 42 for each station are supported on movable arms 41 of double acting air cylinder 39, the cylinder 39 for station 36 being controlled by solenoid air valve S4 and for test station 37 by a solenoid air valve S1. The stop members 35 are positioned below the test stations and normally block or stop switches in the test stations within either the coil 38 or the sleeve 40. Solenoids S6 and S2 are provided for retracting the stop members from their blocking positions for test stations 36 and 37 respectively to release the switches from the stations when the contactors 42 are retracted. A protective cover plate 41 and interlock switch 51 on test station 37 reduce the high potential hazard.

A gate 53 in the "input A" track 29 which guides the switches to test station 36 may be rotated counter-clockwise as seen in Fig. 2 to block the track 29 and deflect switches into a "by-pass" track 54 whenever switches jam or pile up in the input track 29 to depress the actuator for a normally open switch 33 which triggers the test set. This circuit will be discussed in detail below.

At the output or lower end of test station 36 switches may be guided into either a "reject A" track 46 or the "input B" track 47 for test station 37, the routing of the switch being controlled by a deflecting or "accept" gate 44 operated by solenoid S7. Likewise, an "accept" gate 45 at the lower end of the test station 37 routes switches therefrom into either the "test good" track 49 or the "reject B" track 48. Another gate 52 in the lower portion of "reject A" track 46 is provided for deflecting rejected switches into a "selective reject" track 50. Solenoid S8 controls gate 52 and its operation will also be discussed below. "Reject A" track 46, "selective reject" track 50, "test good" track 49 and "reject B" track 48 are terminated with receptacles 24, 25, 26 and 27 respectively at the lower end of the fixture adjacent receptacle 23 for the "by-pass" track 54.

The following brief description of the fixture operation is given in order to facilitate following the detailed description of the test set which follows. A switch passing down the "input A" track 29 triggers the test set 32 by momentarily closing the normally open switch 33 and then is stopped in the first test station 36 by the stop member 35. The test set energizes the solenoid S4 to operate the air valve for air cylinder 39 to raise arm 41 permitting contactors 42 to make contact with terminals of the dry reed switch 18 which is held within the coil 38. The test set then subjects the dry reed switch to a succession of "operational" tests by controlling the strength of the field of coil 38. In the event that the switch fails any of the "operational" tests, gate 44 will be operated by solenoid S7 to block the "input B" track 47 (as shown) so that when the switch is released from the station by the retraction of stop 35 and contactors 42, the tested switch will be deflected into the "reject A" track 46. If the switch passes the tests, gate 44 will block the "reject A" track 46 and the switches will be deflected into the "input B" track 47 for the second test station 37 where they will, in identical fashion, be connected into the high potential "breakdown" test circuit of the test set. In test station 37 an operating coil such as 38 is not required consequently a sleeve 40 is utilized for holding a switch in place when contactors 42 are moved to engage the terminals thereof. When the switch is released from the first test station another switch is normally dropped from the conveyor into the "input A" track 29 so that tests may be performed on switches in both test stations simultaneously. Tested switches from the lower test station 37 are deflected either into the "test good" track 49 or the "reject B" track 48. A circuit is provided in the test set for selectively sorting specific types of "operational" rejects from the "reject A" track 46 to the "selective reject" track 50 by the operation of solenoid S8 which controls gate 52.

In the detailed description of the test set shown generally as box 32 in Fig. 3, reference will now be made to the schematic diagram of Figs. 5 through 8 in which Fig. 5 shows the automatic stepping circuit, Fig. 6 shows the recorders and "operational" test relays, Fig. 7 shows the test fixture actuating solenoids and the "breakdown" test circuit, and Fig. 8 shows the control relays for the solenoids, counters and recorders and also the counters. Since a large number of relays are employed in this circuit, the relays have been numbered as follows in order to facilitate following the description: Relays RY1 through 4 inclusively and relay RY20 are included in Fig. 7, the high potential breakdown circuit; relays RY6 through 9 and 14 through 19 inclusively are included in Fig. 6, the recorder and "operational" test circuits respectively; relays RY10 through 13 are included in Fig. 5, the stepping circuit, and relays RY21 through 31 and RY33 through 40 inclusively are included in Fig. 8, the control relays for the solenoids and counters.

Stepping circuit (Fig. 5)

Normally open switch 33 (Fig. 7) in the test fixture "input A" track 29 (Fig. 2) is closed by a switch passing down to the first test station 36 to initiate the automatic operating sequence of the test set by triggering the automatic operation of a stepping switch 62. In operating, switch 33 completes the energizing circuit for relay RY12, one side of the operating winding of the relay being connected to a positive potential lead 106 (Fig. 8) through switch 33 and the other side being connected to the grounded, negative potential side of the rectifier 66. Relay RY12 thereupon operates to complete the energizing circuit for relay RY13 through its contacts 65 which connects the positive potential lead 106 to one side of the operating winding of the relay, the other side being connected to the grounded side of the rectifier 66. As soon as the switch 62 is stepped to its first position, a holding or energizing circuit for relay RY13 is established through the contact arm of the first deck so that it will remain operated after relay RY12 is released. This circuit will open when the switch 62 is stepped all the way around and returns to the first step to release relay RY13 to end a complete test cycle. The contacts of relay RY13 complete a charging circuit for condenser 68 across the winding of relay RY12 which may be traced from the plus side of rectifier 66 through the closed contacts of relay RY13, resistor 69, the operated contacts 67 of relay RY12 to the winding of relay RY12 and the one side of the condenser. Condenser 68 and resistor 69 permit the application of a discharge pulse from the condenser to relay RY12 to insure proper operation of the relay should the triggering pulse from switch 33 be too brief to keep the relay RY12 operated long enough to operate relay RY13.

When relay RY13 is operated, its closed contacts also close the energizing circuit for relay RY10 through normally closed contacts 73 of relay RY11. This energizing circuit may be traced from the positive side of rectifier 66, through the operated contacts of relay RY13, through the normally closed contacts 73 of relay RY11 to the one side of the operating winding of relay RY10. The other side of the operating winding is connected to ground potential through a control switch 10A (which may be opened to stop the automatic stepping of the selector switch 62) through the normally closed contacts c of relay RY24 (Fig. 8) to the grounded lead 108 of the 28 volt source (Fig. 8). When relay RY10 operates, its contacts close to complete the energizing circuit for relay RY11 through the operated contacts of relay RY13 which connects the positive potential side of the rectifier 66 to one side of the operating coil of relay RY11, the other side being connected in the same grounding circuit described for relay RY10. Relays RY10 and RY11 are then alternately operated and released in "flip-flop" manner by the alternate charging and discharging of condensers 75 and 76 by rectifier 66. Whenever relay RY11 operates, its contacts 77 close the energizing circuit for selector switch 62 to cause the selector switch to step around, step by step, to sequentially send controlling signals for the test set for its automatic operation.

A starting switch 78 is provided for manually triggering the test set in the same way as switch 33. In this case the positive potential side of the 28 volt source (Fig. 8) is applied through lead 106 through the switch 78 to energize the relay RY12. In addition, a jogging switch 79 permits energizing the selector switch 62 to step the selector as desired. A description of the operation of the test set as the switch 62 steps from position to position will be given after the principal circuits have been described.

Test station stops and switch terminal contactors operation (Figs. 5, 7 and 8)

When the contact arm of the second deck of switch 62 is stepped to position 2, the energizing circuit for relay RY28 is completed through to the positive battery lead 106. This circuit may be traced from the positive potential lead 106, through the contact arm and contact of the second deck of the switch to one side of the winding of the relay RY28, the other side of which is connected to the grounded lead 108 (Fig. 8), through a resistance 171. Operated contacts b of relay RY28 close to energize relay RY37, the second test station 37 contactor relay. This circuit may be traced from the positive potential lead 106 through the operated contacts *b* of relay RY28 to one side of the winding of relay RY37, the other side of the winding being connected directly to the grounded lead 108. This relay RY37 in turn operates to energize the air valve solenoid S1 by connecting one side of the operating winding of the solenoid to the positive potential lead 106 through its closed contacts, the other side of the solenoid winding being connected directly to the grounded lead 108. The air valve solenoid S1 actuates the contactor air cylinder 39 to connect a switch in test station 37 into the "breakdown" test circuit. Operated contacts *a* of relay RY28 complete the circuit for relay RY26 by connecting the positive potential lead 106 to one side of its winding, the other side being connected to the grounded lead 108. Relay RY26 locks up to the positive battery lead 106 through its contacts *a*. Operated contacts *b* of relay RY26 connects the positive polarity lead 106 to one side of the winding of relay RY36 to complete its energizing circuit. Relay RY36 operates to energize air valve solenoid S4 for air cylinder 39 to connect the switch in the first test station 36 into the operational test circuit. On operating, relay RY36 also completes the energizing circuit for the "Total Tested" counter 117 through the positive battery lead 106.

When switch 62 steps to its tenth position, the second deck contact arm closes the energizing circuit for relay RY38 by connecting the positive potential lead 106 to one side of its winding, the other side being connected directly to the grounded lead 108. The contacts of relay RY38 close to energize the solenoid S6, by connecting the positive potential lead 106 to one side of its winding, the other side being connected to the grounded lead 108. Solenoid S6 operates to withdraw the stop member 35 from the first test station 36. The pulse delivered through the selector switch 62 which energizes relay RY38 also releases relay RY26 by temporarily applying plus 28 volts to one side of resistor 138 (which is connected across the coil of the relay RY26) through closed contacts *c* of relay RY26 to short out its operating coil. Relay RY26 releases to retract the contactor from the first test station 36 by opening the energizing circuit for relay RY36. The relay RY37 is released to retract the contactor from the second test station 37 in identical fashion, and over similar circuits, by releasing relay RY28 with an operating pulse from the seventh position of the second deck of switch 62 for operating relay RY39 which operates to energize solenoid S2 for retracting stop 35 from the second test station 37. Thus as seen in Fig. 11, the solenoid air valve S1 for test station 37 is operated at the second step of switch 62, the air valve solenoid S4 for test station 36 being operated immediately thereafter and solenoid S1 is released at the beginning of the seventh step while solenoid S4 is released at the beginning of the tenth step.

*Jamming circuit (Figs. 5 and 8)*

In the event that switches become jammed in the test fixture and pile up in the "input A" track 29, the triggering switch 33 will be held closed and relay RY12 of the stepping circuit, which normally releases after about two steps of the switch 62, will remain operated by battery supplied through switch 33. This jamming circuit is operative to prevent subsequent switches from piling up in the track 29. When the movable contact arm 82 of the third deck of selector switch 62 reaches its last or eleventh position, the energized contact arm sends a "jam" signal (plus battery from lead 106) over a wire 83 to the normally closed contact 85 of switch 84 (Fig. 8), back over wire 86 through contacts 87 of relay RY12 to close the circuit for energizing relay RY24 (Fig. 8). Relay RY24 operates to close the energizing circuit for the solenoid S5 for gate 53 (Fig. 2) which then is actuated to deflect subsequent incoming switches down the "by-pass" track 54 into receptacle 23.

The switch 84 (Fig. 8) is provided for resetting relay RY24 which locks up through its operated contacts *a* through the normally closed contacts *b* of switch 84 to the positive battery lead 106. Operation of switch 84, after the trouble has been cleared, to its "reset" position will open the lock-up circuit to de-energize relay RY24. To simulate a jammed condition switch 84 is turned to its "manual" position thereby closing its contacts *c* to close the energizing circuit for relay RY24 to the positive battery lead 106. Whenever the jam solenoid control relay RY35 is operated, a relay RY32 is operated to energize a warning buzzer 136. This buzzer circuit is opened when switch 84 is turned to "manual" by the opening of contacts *d* thereof.

*Operational test circuit (Figs. 7 and 6)*

Test relays RY16, RY15 and RY18 (Fig. 6) are successively operated (by the third deck of stepping switch 62) to control the strength of the magnetic field of the coil 38 for performing "operational" tests on a dry reed switch 18 positioned in the first test station 36. One side of each of these relays is connected to the grounded lead 108 so that when the contact arm 82 moves to the fourth, fifth and seventh positions the positive potential lead 106, connected to the arm 82, will be connected to the other sides of the windings of the relays RY16, RY15 and RY18, respectively, to cause them to operate. The test coil 38 of test station 36, Fig. 2, is connected in series with a battery 93 and resistors 94 through 98 inclusively, the resistors 95, 96 and 97 having normally open, normally open and normally closed contacts *b*, *c*, and *e* on relays RY15, RY16 and RY18 respectively for varying the coil current when the relays are operated.

Normally the relays RY15, RY16 and RY18 are released and as seen in Fig. 10, a current of 4.6 milliamperes is in the coil circuit, the contacts *e* of relay RY18 shorting out a portion of the full series loop. The tests are performed in the following sequence as controlled by the fourth, fifth, sixth and seventh through ninth steps of the switch 62:

First (step 4 of switch 62), "the non-operate" test when relay RY16 is operated, its contacts *c* short out part of resistor 96 and all of resistors 97 and 98 to produce a coil current of 7.8 milliamperes; next (step 5 of switch 62), the "operate" test when relay RY15 is operated, its contacts *b* short out part of resistor 95 and all of resistors 96, 97 and 98 to produce a coil current of 10.2 milliamperes; next (step 6 of switch 62), the "hold" test when relay RY17 is operated (through a similar energizing circuit traced from the positive potential lead 106, through the arm 82 and the sixth contact of the switch 62 to the one side of the relay, the other side being connected to the grounded lead 108), the normal "hold" current of 4.6 milliamperes is in the loop and finally for the "release" test (steps 7, 8 and 9 of switch 62), relay RY18 is operated to open its contacts *e* to remove the partial short connection from resistor 97 to produce a coil current of 2.6 milliamperes.

One side of each of the windings of relays RY27, RY25, RY29 and RY30 is connected directly to the grounded lead 108, the other sides being connected in circuit with normally open contacts *a* of relays RY16, RY15, RY17 and RY18, respectively which in turn are connected by lead 99 to the terminal 101 of the dry reed switch, Fig. 7, the other terminal 102 of the switch being connected to the plus 28 volt battery lead 106. When relays RY16, RY15, RY17 and RY18 are successively actuated to subject the dry reed switch to the "non-operate," "operate," "hold" and "release" tests respectively, the windings of relays RY27, RY25, RY29 and RY30 will be successively connected in series with the switch terminals and the 28 volt potential source between the leads 106 and 108. Since for the "non-operate" and "release" tests the switch contacts should be open, this series circuit, including either relay RY27 or RY30, should not provide a closed energizing circuit therefore they should not operate; but relays RY25 and RY29 should operate since the switch contacts should be closed for the "operate" and "hold" tests. Once operated, lock-up circuits are established for holding relays RY27, RY25, RY29 and RY30 operated through lead 104 which is connected to the positive battery lead 106 through normally closed contacts of timer 105 and normally closed contacts of relay RY19.

If the dry reed switch passes the "operational" tests, an energizing path for relay RY33 is established (when relay RY31 is operated on the tenth step by the switch 62 by the arm 82 of the switch connecting the positive potential lead 106 to the one side of the relay winding, the other side being connected to the grounded lead 108) through the non-operated relays RY27 and RY30 and the operated relays RY25 and RY29. This "operational test good path" may be traced from the plus 28 volt lead 106 through operated contacts c of relay RY31, non-operated contacts c of relay RY27, operated contacts c of relay RY25, operated contacts c of relay RY29, non-operated contacts c of relay RY30, operated contacts b of relay RY22 to the winding of relay RY33. The other side of the winding of relay RY33 is connected to the grounded lead 108 so that if the "operational test good path" is closed, the relay RY33 will operate to energize solenoid S7 (for actuating gate 44, Fig. 2) by connecting one side of the solenoid to the positive potential lead 106 through its operated contacts, the other side being connected to the grounded lead 108. If the "operational test good path" is closed from the lead 106 to the "b" contacts of relay RY22, this relay is operated as the contacts b are connected to one side of its own winding, the other side being connected to the grounded lead 108. The operation of relay RY22 will be discussed below in connection with the operation of the breakdown counter 115 (Fig. 8).

In the event that a switch fails the "non-operate" or "release" tests then relay RY27 or RY30 will operate and if the "operate" or "hold" tests are failed then relay RY25 or RY29 will not operate in accordance with the open or closed condition of the above described energizing circuits. The "operational test good path" will therefore be open and relays RY33 (and relay RY22) will not operate and gate 44 will remain in its normal reject position. In addition, when relay RY31 is operated (by step switch 62) appropriate electric counters 111 through 115 (Fig. 8) will be operated to record the failure. One common side of the counters 111 through 115 is connected to the negative potential lead 108 through a disabling switch 161 and the other, positive potential lead 106 is connected to the appropriate counter through a part or all of the following conductive network: the lead 106, to relay RY31 contacts b (operated), the contacts d of relay RY27 (non-operated), contacts d of relay RY25 (operated), contacts d of relay RY29 (operated) and contacts d of relay RY30 (non-operated). It is to be noted that this conductive network ends or terminates at the normally non-operated contacts d of relay RY30. The only time a circuit may be closed from any part of this network to operate one of the failure counters 111, 112, 113 or 114, is when there is a failure. In the case of a failure, one of the relays RY27, 25, 29 or 30 will be operated or released in accordance with the type of failure and the proper indicator will be energized by its failure condition. For example, in the case of a "non-operate" failure, relay RY27 will operate and the "non-operate" counter 111 will be energized through the lead 106, the operated b contacts of relay RY31 and the operated contacts d of relay RY27. Similarly for an "operated" failure relay RY25 will not be operated and the counter 112 will be energized from the network through the non-operated contacts d of relays RY25; for a "hold" failure relay RY29 will not be operated and the counter 113 will be energized from the network through the non-operated contacts d of relay RY29; and for a "release" failure relay RY30 will be operated and counter 114 will be energized from the network through the operated contacts d of relay RY30. A graphic record of "non-operate" and "operate" test failures is made by the recorder 139 which will be discussed below.

*High potential breakdown test circuit (Fig. 7)*

In addition to the "operational" tests, the switches are also subjected to a "breakdown" voltage test in the second test station 37 while switches are being tested in the first test station 36. The "breakdown" test is performed to test, by sustained ionization thereof, the evacuation or gas content of the glass enclosure for the switch and is not an electrical breakdown test in the normal sense. The switches are sealed in a partial vacuum having a prescribed forming gas atmosphere (97% nitrogen and 3% hydrogen) which is tested as follows: First the terminals of the switches are subjected to an alternating potential difference of about 1700 volts for an instant immediately followed by a reduced sustained alternating potential difference of about 800 volts for approximately ¾ of a second. Switches which remain ionized under this second voltage condition sufficiently to conduct a current adequate to operate a relay (RY4) connected in circuit therewith pass the test for proper gas content.

Relay RY14 (Fig. 6) which initiates the "breakdown" test is operated by the closing of contacts b of relay RY16 when the "non-operate" test is made on another switch in test station 36. Operated relay RY14 locks up through its contacts a through contacts c of relay RY18 to plus battery lead 106. When relay RY18 operates for the "release" test, this lock-up circuit will open to mark the completion of the "breakdown" test. On operating, relay RY14 connects through its contacts b the positive battery lead 106 to lead 121 (Fig. 7) to operate relay RY2. When relay RY2 operates, 115 volts alternating current from source 122 is applied through a switch 123, operated contacts of interlock relay RY1 (controlled by switch 51 on test fixture) and the operated contacts a and c of relay RY2 to auto-transformer 124. The output of transformer 124 is connected through released contacts a of relay RY3 to the primary winding of a voltage step-up transformer 125, the secondary of which is connected through 100,000 ohm resistors 126 and 127 to the terminals 128 and 129 of a switch in the second test station 37. This initial circuit applies about 1700 volts across the switch which should cause the partially evacuated gas therein to ionize. When relay RY2 operates, its contacts b close the energizing circuit for relay RY3 which operates after a slight delay resulting from the condenser 130 connected across its winding through normally closed contacts b thereof and the resistor 131 connected in series with the winding. When the relay RY3 operates the input potential to the primary winding of transformer 125 is reduced to about ½ its previous value by switching the input of the transformer 125 from the output of transformer 124 to the low voltage winding of autotransformer 132, the high voltage winding of which is connected across the output of transformer 124. This results in the application of the desired initial high breakdown potential for the switch followed by the reduced sustaining potential as required for the test.

It has been found that for good switches a current of about 7 milliamperes or more will be established in the secondary winding of transformer 125 and the circuit for gas tube 133 has been adjusted to fire for currents of 7 milliamperes or more. The main anode-cathode circuit of this tube will thereupon fire so that transformer 134 will energize relay RY4. The gas tube effectively rectifies the transformer current each half cycle and a condenser 135 charges to operate relay RY4 without chatter. Relay RY4 controls the operation of gate 45 by energizing relay RY23 which operates closing a lock-up circuit through its contacts a and closing the energizing circuit for relay RY34 through operated contacts c, lead 104, the operated contacts of timer 105, the normally closed contacts of relay RY19 to positive battery lead 106. Relay RY34 operates to energize solenoid S3 which actuates gate 45 to block the "reject B" track 48 and to deflect the switches into the "test good" track 49. The operated contacts of relay RY34 also energize the "Total Good" counter 116 (Fig. 8). Of course if the switch fails the "breakdown" test relay RY4 will not operate consequently relays RY23 and RY34 will not operate and gate 45 will remain in its normal reject position.

A special circuit is provided for controlling the breakdown counter 115 (Fig. 8) since, due to "operational" failures, not all switches tested in the first test station 36 pass into the second test station 37. False counts (and recordings to be discussed below) of breakdown failures (i.e. when test station 37 is empty) are prevented by relay RY21 which will be operated only if all "operational" tests are passed by a switch tested in the prior test in the first test station 36. As mentioned above, relay RY22 is energized over the "operational test good path," when a switch in the test station 36 passes the tests, by the operation of relay RY31 as controlled by step switch 62. A lock-up circuit to lead 104 similar to that of relays RY25, RY27, RY29 and RY30 is provided for relay RY22. Contacts c of relay RY22 close an energizing circuit for relay RY21 which operates and locks up through normally closed contacts b of relay RY18 (the "release" test relay) until the relay RY18 is operated for the "release" test of the next test cycle. Relay RY21 therefore "remembers" that a switch has fallen into the "breakdown" test station 37. When a switch in the subsequent test cycle then fails the "breakdown" test, a "breakdown" reject is counted by actuating relay RY8 (Fig. 6). Relay RY8 also controls the operation of the recording pen 142 of the recorder 139 which will be discussed below in connection with the "Recorder Circuit." The energizing circuit for relay RY8 may be traced from the positive battery lead 106, the normally closed contacts of relay RY19, the normally closed contacts of timer 105, lead 104, the normally closed contacts c and b of relay RY23 (for a breakdown failure, relay RY23 will not be operated), through the operated contacts b of relay RY21, the operated contacts c of relay RY17 to the winding of relay RY8 (Fig. 6). Operated contacts d of relay RY8 close the circuit for the breakdown counter 115 to the normally open contacts b of relay RY31 so that when the relay RY31 is operated the breakdown counter 115 will be energized.

*Operation of selective reject gate 52 (Fig. 8)*

Selection switch 137 (Fig. 8) may be set to any one of four positions to selectively deflect specific types of "operational" rejected switches into the "selective reject" track 50. The operated contacts of relay RY40 close the energizing circuit for solenoid S8 which controls the gate 52. The "operational test good path" discussed above in connection with the "operational" tests, controls the operation of relay RY40 so that when relay RY31 is operated (during the tenth step of switch 62) and a switch has failed an "operational" test to which switch 137 has been set, solenoid S8 will be operated to actuate the gate 52 so that when released from the test station 36, the switch will be deflected into track 50. For example, if it is desired to select "non-operate" failures, switch 137 is set to the "non-operate" position so that relay RY40 will be energized when the non-operate relay RY27 operates as a result of a switch in the test fixture failing the "non-operate" test. This circuit may be traced from the winding of the relay RY40 through the switch to operated contacts b and c of relay RY27 and the operated contacts c of relay RY31 to the plus battery lead 106.

*Recorder circuit*

Step switch 140, Fig. 6, controls pens 141 of a conventional multi-pen type recorder 139. The switch 140 is operated in synchronism with the assembly machine so that "operate" and "non-operate" test failures may be traced back to their originating heads on the assembly machine. As mentioned above, the assembly machine has 18 heads, consequently 18 recording pens, shown schematically as windings 141, are provided for recording the failures therefrom. In addition, the recorder 139 includes a pen 142 for breakdown failures and a pen 143 for making hourly time records on the record sheet (not shown) which is driven by motor 157.

The conveyor 20 shown in Fig. 1 has 90 receptacles 19 (or 5 groups of 18 in each) and since successive switches from the assembly machine are dropped into successive receptacles, switches from each head will always be carried by the same 5 receptacles ( a corresponding one of each group of 18). A switch 150 on the conveyor frame (Fig. 1) is operated by cams 152 every time the assembly machine indexes one position. When actuated, the switch 150 completes the energizing circuit for the step switch 140 so that the switch will step in synchronism with the assembly machine. The circuit may be traced from the positive side of the D.C. source 155 through the operated switch 150 through the second deck contacts (positions 2 through 18), the contactor arm of the second deck, through the self-interrupter switch 153 to one side of the stepping coil, the other side of which is connected directly to the other side of the source 155.

A second switch 151 on the conveyor frame is closed by cams 156 spaced once every 18 receptacles so that they close switch 151 once every complete revolution of the assembly machine. When this switch is closed a circuit is complete from the positive side of the source 155 through the contactor arm of the second deck to the one side of the actuator for the switch through the self-interrupting switch 153 to continuously step the switch to the first position, which is the only open position in the energizing circuit. In other words, this switch is self-synchronizing to insure connecting the proper recording pen with the corresponding assembly head for the switch currently being tested in the test station 36. Since a standard 22 position step switch is used, positions 19, 20, 21 and 22 of the second deck are wired directly to the source 155 so that the switch will be stepped continuously to the first position by the time the next switch is dropped into the first test station 36.

A special advantage of the recording circuit for the recording pens 141 is that each pen may be energized for recording distinguishing straight or wobbled marks for "non-operate" and "operate" test failures respectively. Relays RY6, 7, and 8 operate to record "non-operate," "operate" and "breakdown" test failures respectively whenever the relay RY31 (Fig. 8) is operated by the step switch 62 as discussed above. For a "non-operate" failure relay RY27, as discussed in connection with the "operational" tests, is operated and closed contacts b thereof complete an energizing circuit for relay RY6. This circuit may be traced from the positive potential lead 106 through the operated contacts c of relay RY31, operated contacts c and b of relay RY27 to the one side of the winding of relay RY6, the other side being connected directly to the grounded lead 108 together with one side of each of relays RY7 and 8. When relay RY6 is operated its contacts a complete an energizing path from the positive potential lead 106 to the one side of the winding of relay RY9, the other side of which is connected to the grounded lead 108. The relay RY9 thereupon operates to close its contacts b. Relay RY6 also controls the recorder motor 157 and the energizing of the primary winding of transformer 159 for the recording pens. The energizing circuit may be traced from one side of an alternating current source 145 through the operated contacts b of relay RY6 to one side of motor 157 and the transformer 159 primary winding, the other sides of the motor and the transformer winding being connected directly to the other side of the source 145. The operating coil of the proper pen 141 is determined by the position (between contacts 1 through 18) to which the movable contact arm of the first deck of the step switch 140 is set. The energizing circuit for the pens 141 may be traced from the coils of the pens 141 through the contactor arm of the first deck of switch 140 through the closed contacts $b$ of relay RY9, through lead 158 to the energizing winding of transformer 159.

In the case of an "operate" failure, relay RY25 remains unoperated (as discussed above in connection with the operational tests) so that when relay RY31 is operated, by the step switch 62, relay RY7 will be operated through the contacts $b$ of relay RY25 which connects to the "operational test good path" mentioned above. This energizing circuit may be traced from the positive potential lead 106, through operated contacts $c$ of relay RY31, through non-operated contacts $c$ of relay RY27, through the operated contacts $c$ and $b$ of relay RY25 to one side of the winding of relay RY7, the other side being connected directly to the grounded lead 108. When relay RY7 operates, contacts $b$ thereof energizes the recorder motor 157 (in the same manner as with the operation of relay RY6) and contacts $a$ close the circuit between the positive potential lead 106 and the winding of relay RY9 through the normally closed contacts $a$ thereof. Relay RY9 thereupon will open and close at a rate determined by the condenser 159 and resistor 160 to interrupt the recording pen circuit established through the contacts $b$ of relay RY9 to produce a distinguishable vibrated marking, as compared to the non-vibrated marking of the same pens for recording the "non-operate" failures.

For the "breakdown" test failures, relay RY8 is operated by relay RY23 when relay RY31, Fig. 8, is operated by switch 62. The energizing circuit for relay RY8 is described above in connection with the description of the High potential breakdown test circuit. When the relay RY8 closes, its contacts $c$ complete the energizing circuit for the recorder motor 157 (in the same manner as with the operation of relays RY6 and 7) and contacts $a$ close the energizing circuit for the pen 142 across the secondary winding of transformer 159. Contacts $b$ of relay RY8 lock the relay up to the lead 104 (Fig. 8) which is controlled by the timer 105 and the "reset" relay 19. Contacts $d$ control the breakdown counter 115 as discussed above.

The timer 105 controls the interval during which the recorder motor 157 is energized by operated relays RY6, RY7 or RY8. The timer is energized from an A.C. source 159 through contacts $d$ of relay RY31 when relay RY31 is operated (step 9 of switch 62). The timer momentarily opens its contacts after being energized for about 2.5 seconds to release the relays locked up through the "Hold" lead 104. Since the relays holding the recorder relays RY6, RY7, and RY8 are thereby released, these relays also are released opening the recorder motor circuit.

The recorder timing motor 144 is energized directly by the A.C. source 145 and rotates a cam 163 at one revolution per hour for momentarily closing the contacts 146 through 149 inclusively once an hour to energize the pen 143 and the motor 157 for recording an hourly mark on the record sheet. Contacts 146 and 147 close to connect pen 143 across the secondary winding of the transformer 159 and contacts 148 and 149 close to apply potential from the source 145 to the transformer 159 and the motor 157. A time basis is thereby established for making rapid analyses of the rejection record over any period of time.

*Miscellaneous switches, etc.*

A "calibration" switch 164, Fig. 5, is provided for facilitating setting up the test set. The switch controls the operation of a relay RY20 (Fig. 7) having contacts for simulating the operation of the switch contacts in the test fixture.

Switches 161 (Fig. 8), 165 (Fig. 8) and 166 (Fig. 6) in the energizing circuits for the counters, solenoid control relays and the recorder respectively permit disabling them as may be desired when adjusting or repairing the apparatus.

*Step by step operation of test set as controlled by stepping switch 62 (Fig. 5—Fig. 11)*

Step 1.—Stand-by position; the test cycle is started when a switch momentarily actuates switch 33 in the "input A" track to test station 36.

Step 2.—The stepping switch "start" relay RY12 is operated to start the test cycle; the contactors for engaging the switches in the test stations are actuated; and the "reset" relay RY19 is operated.

Step 3.—Allows the contactors to fully close.

Step 4.—Relay RY16 is operated for the "non-operate" test, and relay RY14 is operated for the "breakdown" test.

Step 5.—Relay RY15 is operated for the "operate" test.

Step 6.—Relay RY17 is operated for the "hold" test.

Step 7.—"Breakdown" test relay is released; relay RY18 is operated for the "release" test. "Breakdown" test station contactor (CTTR) is reset and "Breakdown" test station stop is retracted (Bkdn Rls).

Step 9.—"Breakdown" test station stop is reset (Bkdn Rls reset); "count" relay RY31 is operated, and recorder motor is energized.

Step 10.—"Operational" test station contactor is reset, and "operational" test station stop is retracted (Oper Rls Operate).

Step 11.—"Jam" circuit is closed.

The operating sequences of the depending relays are shown in Fig. 11.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a system for subjecting magnetically operable contact type switching devices to a plurality of tests and for controlling the sorting of the articles in accordance with the results of the tests comprising a test circuit for producing a magnetic field for operating the contacts of a device under test and having means for changing the strength of the field as prescribed for each of the tests, means for controlling the routing of tested articles, a control circuit including the contacts of the device under test and a relay for each of the tests for the routing control means and sequential switching means for simultaneously controlling the field strength changing means in the test circuit and for connecting the corresponding relays in the control circuit.

2. A system for testing and sorting switching devices having at least two magnetically operable contact members mounted in fixed space relation in a gas filled housing said system comprising a test fixture having two test stations, a first test circuit for the first test station for producing a magnetic field for operating the contacts and having means for selectively varying the field strength for each of a succession of operational tests, a second test circuit for the second test station for subjecting the devices received from the first test station to a high potential breakdown test, means for controlling the sorting of tested articles and control relays for each of the tests, the control relays being operable in accordance with the results of the respective tests to control the sorting control means.

3. In a system according to claim 2 means in the second test circuit for producing an ionizing potential across the contacts of the device, means for reducing the potential after the gas has ionized and means responsive to ionizing current at the reduced potential for controlling one of the control relays.

4. In combination with a test fixture for electrical articles having at least two test stations, means for making electrical connection to articles in the test stations, means for guiding aricles successively to the test stations, guide means for rejected articles, and means for deflecting articles from the test stations into the reject guide means, of a test set having at least a first and second test circuit for simultaneously subjecting articles in the test stations to different tests, means for actuating the electrical contacting means in the test stations for connecting articles therein into the test circuits, means responsive to test failures in the test circuits for actuating the deflecting means to route rejected articles from the respective test stations to the reject guiding means, means for recording the number of failures for each of the tests, and means responsive to an article failing a test in the first test station for rendering the recording means for the failures of the tests in the second test station inoperative to prevent false counts of test failures therein when articles from the first test station are rounted to the reject guide means and the next article is being tested in the first test station.

5. A system for subjecting electrical devices to a plurality of tests and for controlling the sorting of the devices in accordance wtih the results of the tests, comprising a test circuit including means for establishing the test conditions for each of the tests, means for controlling the routing of tested devices, a control relay for each of the tests to be performed, the control relays being operable in accordance with the results of the respective tests to which a device is subjected, a routing control means actuating circuit including a series path through contacts of the control relays and a source of potential connected in the series path, graphic means for recording test failures, contacts on the control relays for conditioning the recording means for operation when an article fails a test, a timer controlled relay for rendering the recording means inoperative after a predetermined time of operation, and a relay for starting the recording means and the timer.

6. A system for subjecting electrical devices to a plurality of tests and for controlling the sorting of the devices in accordance with the results of the tests, comprising a test circuit including means for establishing the test conditions for each of the tests, means for controlling the routing of tested devices, a control relay for each of the tests to be performed, the control relays being operable in accordance with the results of the respective tests to which a device is subjected, a routing control means actuating circuit including a series path through contacts of the control relays and a source of potential connected in the series path, graphic means for recording test failures, contacts on the control relays for conditioning the recording means for operation when an article fails a test, a timer controlled relay for rendering the recording means inoperative after a predetermined time of operation, a relay for starting the recording means and the timer, and means for producing periodic time reference markings by the recording means.

7. A system for subjecting electrical devices to a plurality of tests and for controlling the sorting of the devices in accordance with the results of the tests, comprising a test circuit including means for establishing the test conditions for each of the tests, means for controlling the routing of tested devices, a control relay for each of the tests to be performed, the control relays being operable in accordance with the results of the respective tests to which a device is subjected, a routing control means actuating circuit including a series path through contacts of the control relays and a source of potential connected in the series path, graphic recording means for making a record of test failures, an energizing source for the recording means, a recording means control circuit, including the series path of the routing control means actuating circuit, for energizing the recording means from the energizing source when one of the control relays is operated in accordance wtih an article failing the corresponding test, and means for energizing the recording means from the energizing source when another of the control relays is operated in accordance with an article failing another test and for interrupting the energizing source to produce a distinguishable graphic recording therefrom.

8. For articles produced on a multiple position assembly machine and delivered successively to a test station, a test circuit for subjecting articles in the test station to at least one electrical test, recording means for each of the assembly positions of the machine, a stepping switch for sequentially preparing the recording means corresponding to the assembly position of the switch delivered to the test station, means responsive to a test failure for producing a signal to actuate the prepared recorder, and means operable every complete cycle of the assembly machine for automatically synchronizing the stepping switch with the assembly machine.

References Cited in the file of this patent
UNITED STATES PATENTS

| 2,571,643 | Youhouse | Oct. 16, 1951 |
| 2,628,572 | Le Goff | Feb. 17, 1953 |
| 2,719,235 | Emmerson | Sept. 27, 1955 |
| 2,566,767 | Hunt | Sept. 4, 1957 |
| 2,848,107 | Juengst et al. | Aug. 19, 1958 |